Feb. 28, 1967 T. P. HAXTON 3,306,628
NON-SWAY ATTACHMENT FOR TRAILER HITCH
Filed July 16, 1965 2 Sheets-Sheet 1
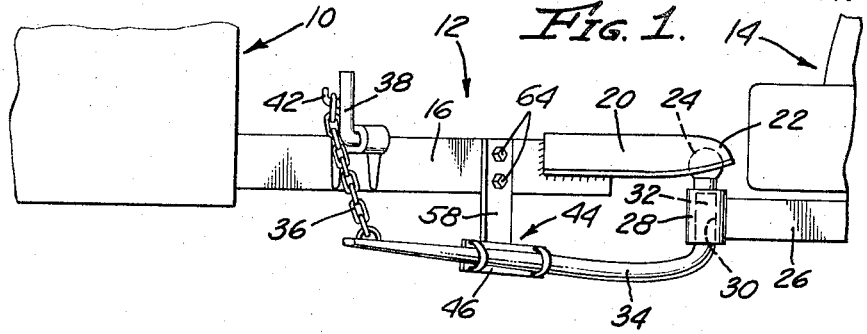
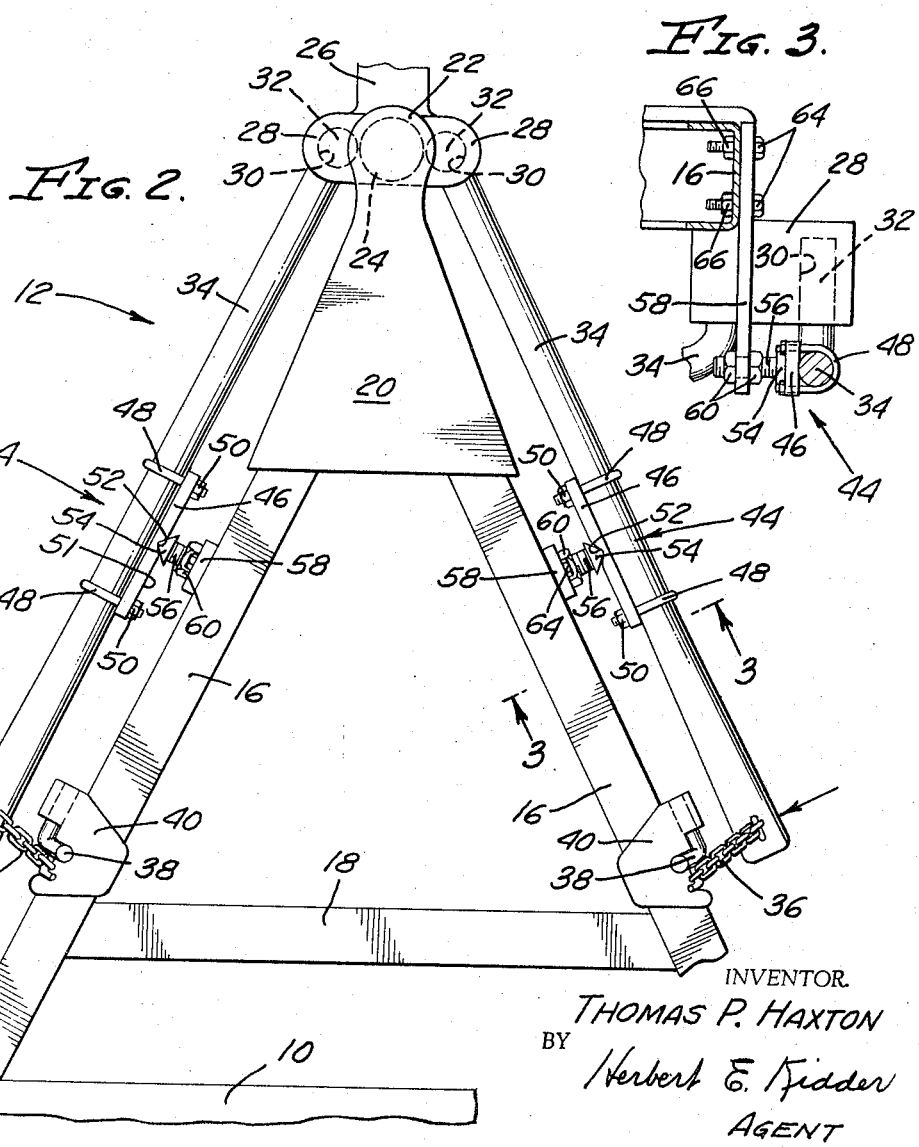
INVENTOR.
THOMAS P. HAXTON
BY
Herbert E. Kidder
AGENT

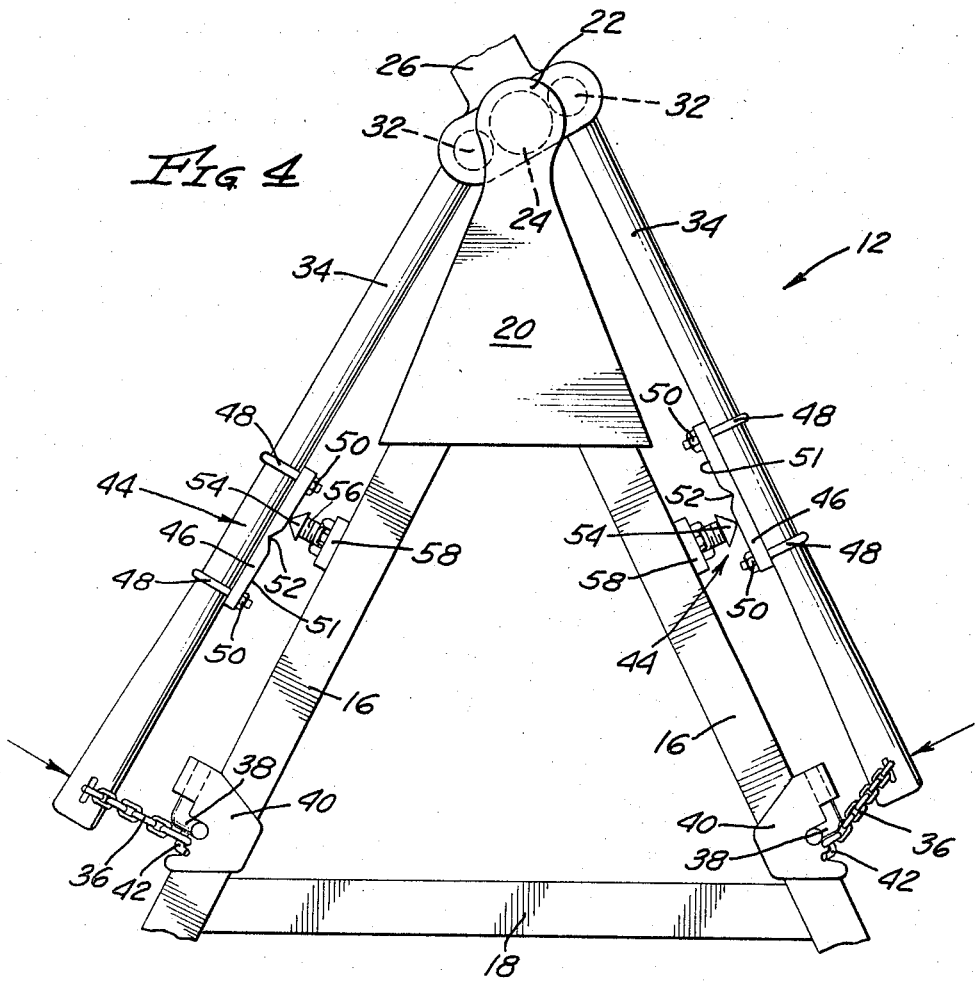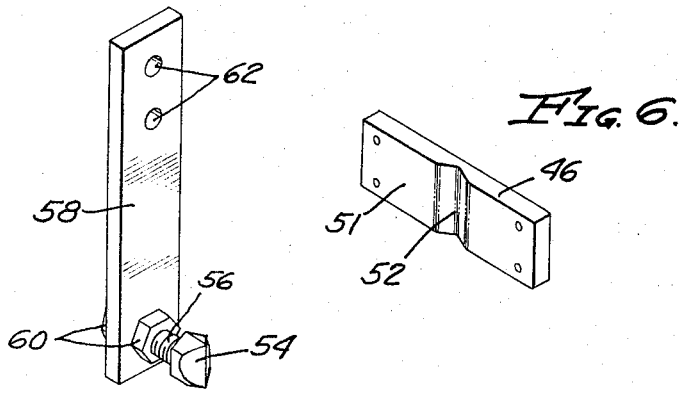
INVENTOR.
THOMAS P. HAXTON
BY Herbert E. Kidder
AGENT

United States Patent Office 3,306,628
Patented Feb. 28, 1967

3,306,628
NON-SWAY ATTACHMENT FOR TRAILER HITCH
Thomas P. Haxton, 25277 Girard St.,
Hemet, Calif. 92343
Filed July 16, 1965, Ser. No. 472,542
2 Claims. (Cl. 280—406)

This invention relates to trailer hitches of the type used to connect a trailer to an automotive vehicle, and its primary object is to provide a trailer hitch that is designed to make the trailer travel straight and true behind he automobile, and keep it from swaying from side to side at high speed or in a cross wind. At the same time, the trailer hitch of the present invention is constructed to permit free turning of the automobile and trailer when traveling ahead or when backing up.

Many trailers have a disconcerting tendency to weave from side to side behind the towing automobile, particularly at high speed or in a cross wind. This weaving tendency is extremely dangerous, and has been responsible for many serious accidents. Control of the automobile is made difficult by any weaving tendency of the trailer, and there have been many instances where owners have practically given up traveling with a particular trailer because of the dangerous way that it sways from side to side. With the present invention, virtually any trailer can be made to trail straight and true behind its towing automobile, and any former swaying tendency is completely eliminated.

Another object of the invention is to provide a stabilizing attachment for use on a load-equalizing trailer hitch, that converts the conventional load-equalizing trailer hitch into an improved, non-sway type of hitch.

A further object of the invention is to provide a trailer hitch of the class described that is sturdy, trouble-free and inexpensive to manufacture.

These and other objects and advantages of the present invention will become apparent to those skilled in the art upon consideration of the following detailed description of the preferred embodiment thereof, reference being had to the accompanying drawings, wherein:

FIGURE 1 is a fragmentary side elevational view of a trailer hitch embodying the principles of the invention;

FIGURE 2 is a top plan view of the same;

FIGURE 3 is a fragmentary sectional view, taken at 3—3 in FIGURE 2;

FIGURE 4 is a view similar to FIGURE 2, showing the hitch in the condition assumed when the automobile and trailer are making a turn;

FIGURE 5 is a perspective view of one part of the invention; and

FIGURE 6 is a perspective view of another part of the invention, which cooperates with the part shown in FIGURE 5.

In the drawings, the reference numeral 10 designates a trailer, which is connected by a hitch 12 to an automobile 14. The trailer 10 includes a pair of frame members 16, that converge forwardly from the front end of the trailer and are connected by a transverse brace 18. The front ends of the frame members 16 are joined by a triangular cap member 20 which has a socket 22 at its apex that is seated on a ball 24. The ball 24 is mounted on the rear end of a trailer hitch drawbar 26, that is welded to the frame of the automobile and projects rearwardly therefrom.

The drawbar 26 has lateral extensions 28 projecting to either side thereof, and formed in the underside of these projections are vertical bore holes 30 which receive the upturned ends 32 of two relatively heavy bars 34 of spring steel. The bore holes 30 are spaced equidistantly on opposite sides of ball 24, as best shown in FIGS. 2 and 4.

The bars 34 diverge rearwardly from the drawbar 26 somewhat below and generally parallel to the frame members 16, and the rear end portion of each bar is tapered slightly in thickness, as shown in FIG. 1, to give it some flexibility for vertical bending. At their rear ends, the bars 34 are connected by chains 36 to releasable chain tighteners 38, each of which consists of an L-shaped lever pivotally mounted on a bracket 40 that is clamped to the frame members 16. The top link of the chain 36 is engaged on a hook 42 projecting laterally from one side of the lever 38. When the lever 38 is swung up to the over-center position shown in the drawings, the chain 36 is pulled tight, and a considerable upward tension is exerted against the rear ends of the bars 34. This has the effect of applying a force to the rear end of the automobile, tending to take part of the weight of the trailer off the rear wheels of the automobile, and transfer it to the front wheels thereof. The trailer hitch described to this point is more-or-less conventional, and is known as a "load-equalizing" hitch, in that the load of the trailer draft frame can be distributed equally between the front and rear wheels of the automobile by merely adjusting the tension of the chain 36, which is accomplished by engaging one link or another over the hook 42 on the lever 38. To release the tension of the chains 36, the lever 38 is merely swung outwardly and downwardly, which lowers the hook 42 until the chain finally slips off.

The stabilizing attachment of the present invention is designated in its entirety by the reference numeral 44. It comprises an elongated, flat bar, or plate 46, which is secured by two U-bolts 48 and nuts 50 to the inner sides of the bars 34 about midway between their ends. The plate 46 has a flat, vertical surface 51 on its inwardly facing side, and midway between its ends, the surface 51 is interrupted by a vertically extending, V-shaped notch 52. A wedge-shaped pivot bolt 54 is normally seated in the notch 52 when the trailer is lined up behind the automobile, as shown in FIG. 2.

The pivot bolt 54 has threaded shank 56 which passes through a hole in the bottom end of a vertical bar 58. A pair of nuts 60 are screwed onto the threaded shank 56 on opposite sides of the vertical bar, and are drawn up tight against the latter. At the upper end of the bar 58 are two vertically spaced bolt holes 62, through which bolts 64 are passed. Bolts 64 also pass through aligned holes in the frame member 16, and are secured thereto by nuts 66.

In normal straight-line driving, the two pivot bolts 54 are seated in their respective V-shaped notches 52, as shown in FIG. 2. It will be noted from FIGS. 2 and 4 that the rear ends of the bars 34 are not located directly below the brackets 40, but are spaced laterally outwardly therefrom. Thus, the chains 36 extend downwardly and outwardly at an angle, and this angular line of pull has an inwardly directed force component (shown by arrows), that pulls the rear ends of the bars 34 in towards the center line of the trailer draft frame. This causes the plate 46 to be pressed tightly against the cam member 54, and the bars 34 act as lever arms, rocking about the pivot bolts 54 as a fulcrum.

The amount of tension in the chains 36 tending to pull the rear ends of the bars 34 inwardly toward the centerline of the trailer draft frame, is dependent upon how far the ends of the bars are displaced away from their respective frame members 16. When the pivot bolts 54 are seated in the notches 52, the rear ends of the bars 34 are allowed to come in to their closest position relative to the frame members 16. Thus, when the trailer is trailing straight and true behind the automobile, the tension in the chains 36 is at a minimum. However, when the trailer tends to swing over to one side or the other of the automobile, the bars 36 are shifted longitudinally relative to their respective frame members 16, owing to the lateral offset of the front end portions 32 of the bars with respect to the ball 24. This longitudinal shifting of the bars 34 causes the plate 46 on one side of the hitch to ride forwardly over its pivot bolt 54, and the plate 46 on the other side to ride rearwardly over its pivot bolt 54.

As each of the pivot bolts 54 rides up out of its V-shaped notch 52, the midportion of the bar 34 is pushed outwardly the distance of the notch depth, and this causes the rear end of the bar to be displaced outwardly approximately twice that distance. Thus, the ends of the bars 34 are suddenly swung outwardly an appreciable distance, and this causes the chains 36 to increase their tension, thereby exerting additional inward pull on the rear end of the bars. Since the bars are fulcrumed about the pivot bolts 54, the increased inward pull exerted by the chains on the rear ends of the bars causes the front ends thereof to pull outwardly against the drawbar 26.

As the trailer draft frame swings over to one side (FIG. 4) one of the bar front ends 32 swings rearwardly and inwardly from its normal position, while the other of the bar front ends 32 swings forwardly and inwardly from its normal position. Thus, both of the bar front ends 32 are moved inwardly toward the centerline of the trailer draft frame as a result of the trailer swinging to one side of the automobile's centerline. The outward force exerted on both of the front ends 32 by the chain tension tends to restore the bar front ends 32 to their original positions, and it is this action that resists lateral swinging of the trailer with respect to the automobile, and that tends to return the trailer to its centered position. As the trailer returns to its centered position, the pivot bolts 54 drop back ino their respective notches 52, and this relieves the chains of their excess tension.

The centering effect produced by the chain tension acting against the rear ends of the bars 34 is quite powerful, but not so great as to interfere with normal turning of the vehicles. When the automobile is turned, the pivot bolts 54 ride up out of the notches 52 and slide over the flat surface in the same manner as described above, and the centering effect merely exerts a slight resistance to turning, which is completely unnoticeable to the driver. Upon straightening the automobile out on its new course, the trailer swings back to the centered position, and the pivot bolts 54 return to their respective notches 52.

While I have shown and described in considerable detail what I believe to be the preferred form of my invention, it will be understood by those skilled in the art that various changes may be made in the shape and arrangement of the several parts without departing from the broad scope of the invention as defined in the following claims.

I claim:
1. A stabilizing device for use with a hitch connecting the draft frame of a trailer to a draft member on an automobile, said hitch including a ball-and-socket connection between said draft frame and said draft member, comprising:
 a pair of generally fore-and-aft extending bars disposed on opposite sides of said trailer draft frame, said bars being connected at their front ends to said automobile draft member at laterally spaced points on opposite sides of said ball-and-socket connection;
 said bars being horizontally swingable with respect to said automobile draft member, but rigid with respect thereto in the vertical direction;
 tension means connected to the rear ends of said bars and exerting a force thereon tending to pull the bars inwardly toward the centerline of the trailer draft frame;
 a plate fixed to the inner side of each of said bars intermediate the ends thereof, said plate having a flat, substantially vertical surface, with a V-shaped notch formed therein;
 a pair of pivot members fixed to opposite sides of said trailer draft frame and projecting laterally outwardly therefrom;
 each of said pivot members normally seating in the notch of its respective plate when the trailer and automobile are in a straight line, and said pivot member being cause to ride up out of said notch and to slide forwardly or rearwardly with respect thereto over said flat vertical surface when the automobile is turned with respect to the trailer;
 each of said members acting as a fulcrum for its respective bar, whereby inward tension exerted against the rear end of the bar causes the front end thereof to exert a lateral outward force on said automobile draft member, tending to center the trailer directly behind the automobile and in a straight line with respect thereto.

2. A stabilizing device for use with a hitch connecting the draft frame of a trailer to a draft member on an automobile, said hitch including a ball-and-socket connection between said draft frame and said draft member, comprising:
 a pair of laterally spaced, generally fore-and-aft extending bars, the front ends of which are attached to said draft member on opposite sides of said ball-and-socket connection;
 said bars being horizontally swingable with respect to said automobile draft member, but rigid with respect thereto in the vertical direction;
 tension means connecting said trailer draft frame to the rear ends of said bars and exerting a force on the latter tending to pull the bars in toward the centerline of the trailer draft frame; and
 a pair of cooperating members associated with each of said bars;
 each of said pairs of members consisting of a first member having a fore-and-aft extending, flat, vertical surface with a notch formed therein intermediate its ends, and a second member having a fulcrum portion normally seated in said notch when the automobile and trailer are in a straight line;
 one of said members being fixed to each of said bars on the inner side thereof, and the other of said members being fixed to the adjacent side of the trailer draft frame;
 said second member being cammed up out of said notch and caused to slide forwardly or rearwardly with respect thereto over said flat vertical surface when the automobile is turned with respect to the trailer, whereby the rear end of the associated bar is moved laterally outward from its normal position, thereby increasing the tension in said tension means;
 each of said second members acting as a fulcrum for its respective bar, whereby inward tension exerted against the rear end of the bar causes the front end thereof to exert a lateral outward force on said automobile draft member, tending to center the trailer directly behind the automobile and in a straight line with respect thereto.

References Cited by the Examiner

UNITED STATES PATENTS

| | | | |
|---|---|---|---|
| 2,808,272 | 10/1957 | Reese | 280—406 |
| 3,194,584 | 7/1965 | Reese | 280—406 |
| 3,206,224 | 9/1965 | Block et al. | 280—406 |

LEO FRIAGLIA, *Primary Examiner.*